(12) United States Patent
Ito et al.

(10) Patent No.: US 11,619,564 B2
(45) Date of Patent: Apr. 4, 2023

(54) TEST APPARATUS FOR TESTING AN ACTUATOR

(71) Applicant: NABTESCO CORPORATION, Tokyo (JP)

(72) Inventors: Koji Ito, Tokyo (JP); Keigo Futamata, Tokyo (JP); Makoto Nagashima, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 331 days.

(21) Appl. No.: 17/001,430

(22) Filed: Aug. 24, 2020

(65) Prior Publication Data
US 2021/0080351 A1 Mar. 18, 2021

(30) Foreign Application Priority Data

Sep. 13, 2019 (JP) .............................. JP2019-167444

(51) Int. Cl.
*G01M 13/025* (2019.01)
*G01M 13/022* (2019.01)
*F16D 23/12* (2006.01)

(52) U.S. Cl.
CPC ........ *G01M 13/022* (2013.01); *G01M 13/025* (2013.01); *F16D 2023/126* (2013.01)

(58) Field of Classification Search
CPC ................................................ G01M 13/025
See application file for complete search history.

(56) References Cited

U.S. PATENT DOCUMENTS

| 4,733,558 A | * | 3/1988 | Grenier | ............... G01M 13/027 73/115.07 |
| 4,802,365 A |   | 2/1989 | Sallberg et al. | |
| 5,425,276 A |   | 6/1995 | Gram et al. | |
| 5,533,403 A | * | 7/1996 | Haeg | ................... G01M 13/027 73/865.6 |
| 5,610,330 A | * | 3/1997 | Fricke | ............... G01M 17/0074 73/146 |

(Continued)

FOREIGN PATENT DOCUMENTS

| CN | 104502136 A | 4/2015 |
| JP | 2010-039893 A | 2/2010 |

OTHER PUBLICATIONS

Extended European Search Report dated Mar. 18, 2021, issued in corresponding European Patent Application No. 20194749.6 (8 pgs.).

*Primary Examiner* — Eric S. McCall
(74) *Attorney, Agent, or Firm* — Pillsbury Winthrop Shaw Pittman, LLP (57) ABSTRACT

Provided is a test apparatus for an actuator, which can easily switch whether to establish or undo the coupling between an actuator to be tested and a load part configured to apply load to the actuator. A test apparatus for an actuator includes a load part for outputting load to be applied to an actuator to be tested, first levers for swinging around a rotational shaft in connection with an output from the load part, an idler link coupled to the output from the actuator to be tested, a second lever coupled to the idler link in a swingable manner and for swinging around a rotational shaft that is arranged coaxially with the rotational shaft of the first levers, and a clutch mechanism for coupling together the first levers and the second lever and undoing the coupling.

4 Claims, 9 Drawing Sheets

(56) References Cited

U.S. PATENT DOCUMENTS

| | | | | |
|---|---|---|---|---|
| 6,257,055 B1* | 7/2001 | Haeg | .................... | G01M 13/027 |
| | | | | 73/116.01 |
| 6,640,638 B1* | 11/2003 | Haeg | .................... | G01M 17/007 |
| | | | | 73/116.01 |
| 7,146,859 B2* | 12/2006 | Dittmann | ............ | G01M 17/007 |
| | | | | 73/669 |
| 2006/0059993 A1* | 3/2006 | Temkin | ............... | G01M 17/007 |
| | | | | 73/669 |
| 2012/0067140 A1* | 3/2012 | Rossi | .................. | G01M 13/027 |
| | | | | 73/862.321 |
| 2019/0287732 A1* | 9/2019 | Nagayama | ................ | H01G 9/15 |
| 2021/0125787 A1* | 4/2021 | Iwaoka | .................. | H01G 9/0029 |
| 2022/0113207 A1* | 4/2022 | Kim | .......................... | G01L 5/28 |
| 2022/0236159 A1* | 7/2022 | Jin | .......................... | G01N 3/567 |

\* cited by examiner

TEST APPARATUS FOR TESTING AN ACTUATOR

CROSS-REFERENCE TO RELATED APPLICATIONS

This application is based on and claims the benefit of priority from Japanese Patent Application Serial No. 2019-167444 (filed on Sep. 13, 2019), the contents of which are incorporated herein.

TECHNICAL FIELD

The present invention relates to a test apparatus for an actuator.

BACKGROUND

Japanese Patent Application Publication No. 2010-39893 discloses a test apparatus for an actuator. The test apparatus is configured to use a load actuator in order to perform a test on a fluid pressure actuator by applying mock load on the fluid pressure actuator.

The test apparatus for an actuator disclosed in Japanese Patent Application Publication No. 2010-39893 dynamically controls the load actuator, the control following capability of which affects the results of the test. In particular, as the product to be tested increases in output, the load actuator accordingly increases in size. Large load actuators have more difficulties in achieving good control following capability than small counterparts.

This problem attributable to delay in control can be overcome by providing a unit for mechanically generating load instead of applying load as a result of controlling a load actuator. To use the unit for mechanically generating load, however, it is required to easily switch whether to establish or undo the coupling between the actuator to be tested and the unit for mechanically generating load. In particular, as the load increases, it becomes more difficult to manually establish the coupling or undo the coupling.

SUMMARY

The present invention is made in light of the above, and an objective of the present invention is to provide a test apparatus for an actuator, which can easily switch whether to establish or undo the coupling between an actuator to be tested and a load unit configured to apply load to the actuator.

In order to solve the above problem, a test apparatus for an actuator includes a load part for outputting load to be applied to an actuator to be tested, a first lever part for swinging around a rotational shaft in connection with an output from the load part, a link part coupled to the output from the actuator to be tested, a second lever part coupled to the link part in a swingable manner, where the second lever part swings around a rotational shaft that is coaxially arranged with the rotational shaft of the first lever part, and a power transmitting part for establishing and undoing coupling between the first lever part and the second lever part.

With the above configurations, the first lever part, which swings around the rotational shaft in connection with the output from the load part, is coupled by the power transmitting part to the second lever part, which is coupled to the link part coupled to the output from the actuator to be tested, and the coupling is undone by the power transmitting part. Accordingly, it can be easily switched whether to establish or undo the coupling between the actuator to be tested and the load part for outputting the load to be applied to the actuator.

As for the above-described test apparatus for an actuator, the power transmitting part preferably includes a pin part for penetrating through the first lever part and the second lever part, and an operating lever part provided on the first lever part in a swingable manner. The operating lever part moves the pin part between a penetrating position at which the pin part penetrates through the first and second lever parts and a non-penetrating position at which the pin part does not penetrate through the first and second lever parts.

With the above configurations, it can be easily achieved to pull the pin part out of the first and second lever parts and to insert the pin part into the first and second lever parts by rotating the operating lever part, which is provided on the first lever part in a swingable manner.

As for the above-described test apparatus for an actuator, one of the first and second lever parts is preferably held by the other on both sides thereof.

With the above configurations, one of the first lever part and the second lever part is held by the other on both sides thereof, not supported only on one side. Accordingly, the pin part is equally loaded.

As for the above-described test apparatus for an actuator, one end of the operating lever part provided on the first lever part is preferably positioned lower than a position in the operating lever part at which the pin part is provided on the operating lever part. With the above configurations, the operating lever part can be easily operated.

As for the above-described test apparatus for an actuator, one of the second lever part and the link part is preferably coupled to the other on both sides thereof.

With the above configurations, one of the second lever part and the link part holds the other on both sides, not on one side. Accordingly, the coupling part between the second lever part and the link part is equally loaded.

DESCRIPTION OF THE PREFERRED EMBODIMENTS

The following describes an embodiment of a test apparatus for an actuator with reference to FIGS. 1 to 6. To the test apparatus, an actuator to be tested is attached in order to test the performance and endurance of the actuator. The actuator is a product designed to actuate flight control surfaces of an aircraft such as ailerons of a main wing and elevators of a tail unit and produces a relatively large output. The actuator makes linear movement to output driving force.

Figure 1:
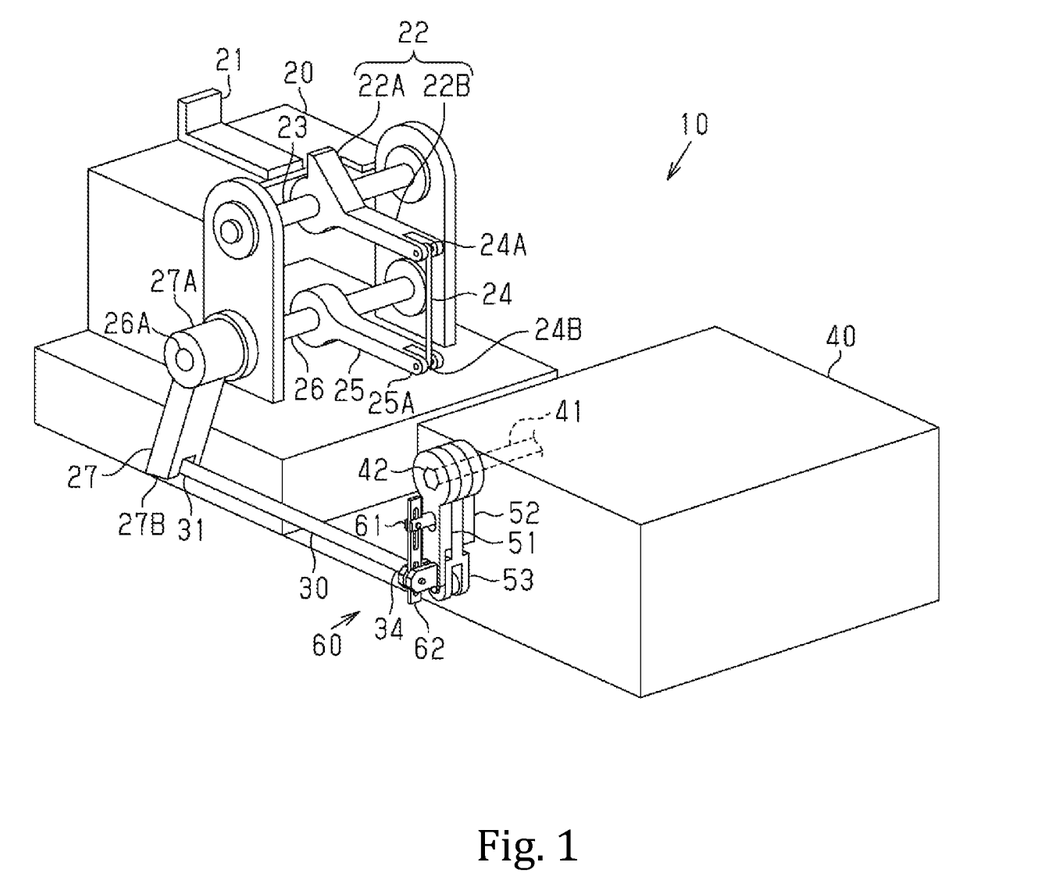
FIG. 1 is a perspective view showing the configuration of a test apparatus for an actuator.

As shown in FIG. 1, a test apparatus 10 for an actuator includes an attaching device 20 configured to allow an actuator to be attached thereto and to output driving force, a load unit 40 for applying load, and an idler link 30 for coupling the output from the attaching device 20 and the load provided by the load unit 40. The idler link 30 corresponds to a link part to be coupled to an output from an actuator to be tested.

The attaching device 20 includes an attaching part 21 to which an actuator (not shown) is to be attached and a driving part 22 to be driven upon operation of the actuator. To the attaching part 21, the main body of the actuator is fixed. The driving part 22 has a passive part 22A to which the output shaft of the actuator is fixed and a transmitting part 22B for transmitting driving force. The driving part 22 is integrally provided with the passive part 22A, the transmitting part 22B and a driving shaft 23. The direction in which the driving force of the actuator acts is orthogonal to the axial direction of the driving shaft 23. When driven by the actuator, the passive part 22A of the driving part 22 swings around the axis of the driving shaft 23. In other words, the linear movement of the actuator is converted by the driving part 22 into the swing movement.

To the top end of the transmitting part 22B of the driving part 22, an upper end 24A of a coupling link 24 is coupled in a swingable manner. As the transmitting part 22B of the driving part 22 swings, the coupling link 24 moves vertically. In other words, the swing movement of the driving part 22 is converted by the coupling link 24 into linear movement. To a lower end 24B of the coupling link 24, a top end 25A of a passive lever 25 is coupled in a swingable manner. The passive lever 25 is integrally formed with a coupling shaft 26. As the coupling link 24 moves vertically, the passive lever 25 swings around the axis of the coupling shaft 26. In other words, the linear movement of the coupling link 24 is converted by the passive lever 25 into swing movement.

To a left end 26A (the front end in the drawing) of the coupling shaft 26, a coupling lever 27, which is configured to rotate integrally with the coupling shaft 26, is fixed. A base end 27A of the coupling lever 27 is fixed to the coupling shaft 26. To a top end 27B of the coupling lever 27, a base end 31 of the idler link 30 is coupled such that the base end 31 of the idler link 30 is capable of swinging around the axis of a rotational shaft 32. In other words, the output from the actuator is transmitted via the idler link 30.

Figure 2:
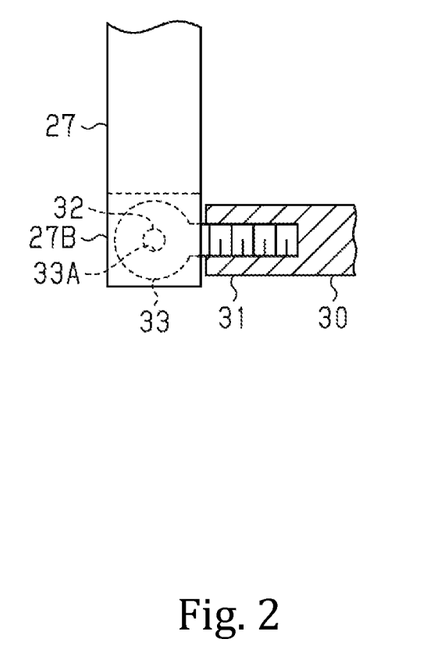
FIG. 2 is a front view showing the configuration of the coupling between a link and a coupling lever of the actuator test apparatus.

As shown in FIG. 2, a rod end 33 having an annular shape is screwed into the base end 31 of the idler link 30. The top end 27B of the coupling lever 27 is U-shaped and coupled to the rod end 33 such that the rod end 33 is sandwiched in the U-shaped top end 27B. The rotational shaft 32 is inserted into a through hole 33A in the rod end 33 and into the top end 27B of the coupling lever 27.

The load part 40 is configured to mechanically generate load, and a load shaft 41 of the load part 40 outputs, as the load, pressing force produced by a plurality of torsion springs. In other words, the load part 40 outputs, via the load shaft 41, the load to be applied to the actuator.

Figure 3:
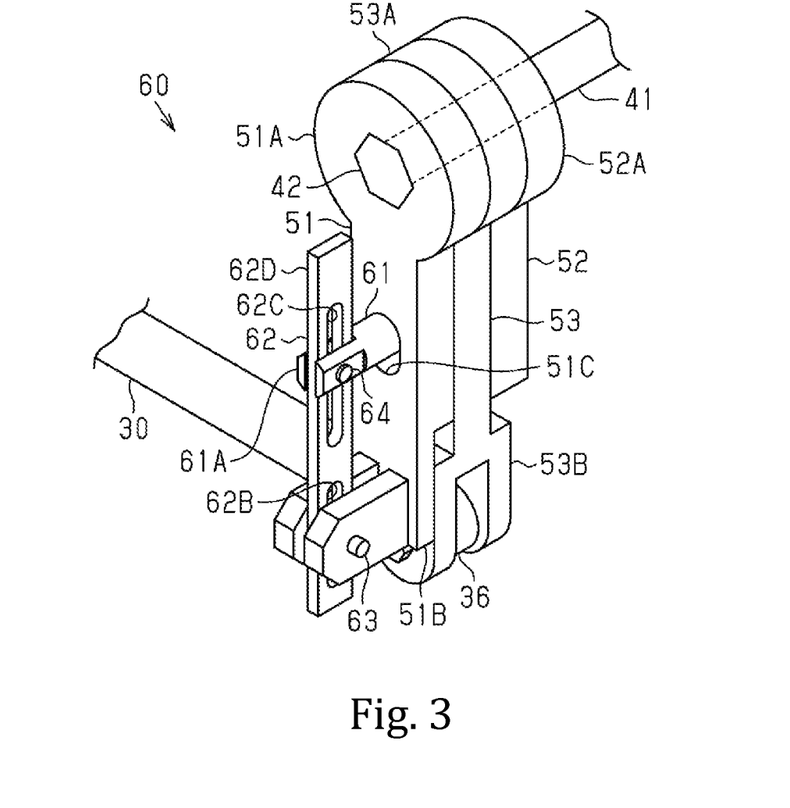
FIG. 3 is a perspective view showing a power transmitting part of the actuator test apparatus in a coupled state.
Figure 4:
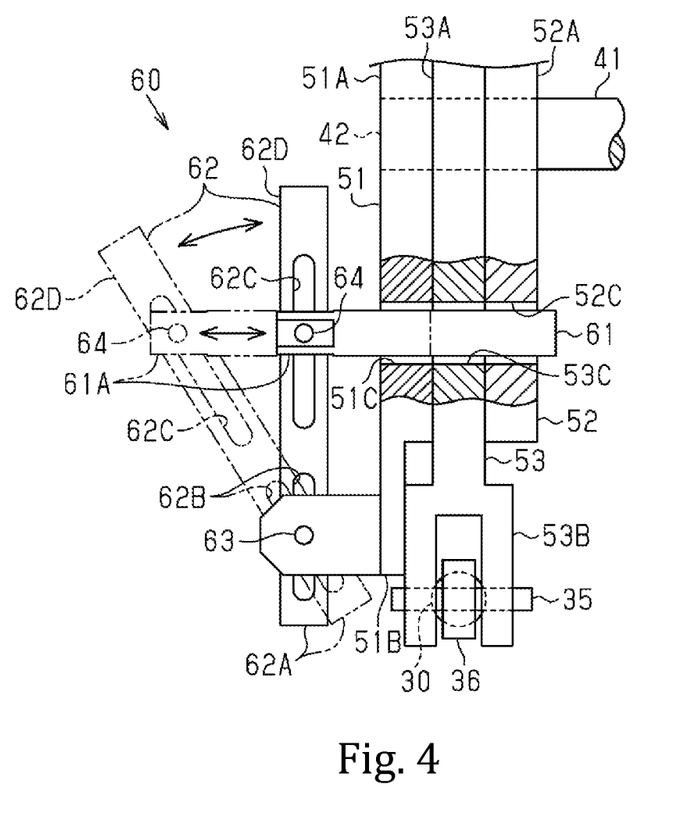
FIG. 4 is a side view showing how the power transmitting part of the actuator test apparatus operates.

As shown in FIGS. 3 and 4, two first levers 51 and 52 and a second lever 53 sandwiched between the first levers 51 and 52 are arranged on a top end 42 of the load shaft 41. Base ends 51A and 52A of the first levers 51 and 52 are fixed to the load shaft 41 and configured to swing integrally with the load shaft 41. A base end 53A of the second lever 53 is provided onto the load shaft 41 in a rotatable manner. Here, the axis of the load shaft 41 coincides with the rotational axis of the first levers 51 and 52 and the rotational axis of the second lever 53. The first levers 51 and 52 correspond to a first lever part configured to swing around the rotational axis in connection with the output from the load part 40. The second lever 53 corresponds to a second lever part coupled to the link part such that the second lever part swings around the rotational axis.

Figure 5:
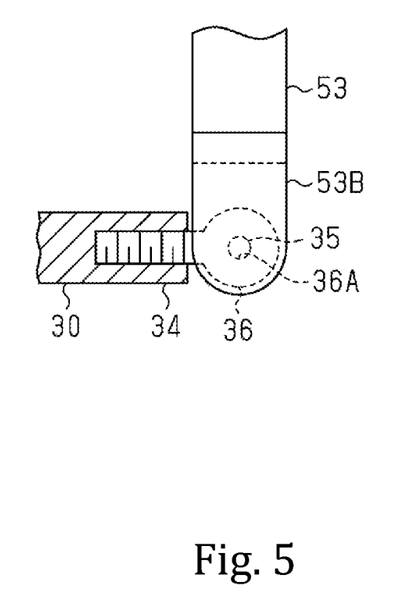
FIG. 5 is a front view showing the configuration of the coupling between the link of the actuator test apparatus and a second lever.

As shown in FIG. 5, a top end 34 of the idler link 30 is coupled to a top end 53B of the second lever 53 such that the top end 34 of the idler link 30 swings around the axis of a rotational shaft 35. Into the top end 34 of the idler link 30, a rod end 36 having an annular shape is screwed. The top end 53B of the second lever 53 is U-shaped and coupled to the rod end 36 such that the rod end 36 is sandwiched in the U-shaped end 53B. In other words, the second lever 53 is coupled to the top end 34 of the idler link 30 such that the top end 34 is supported on both sides thereof. The rotational shaft 35 is inserted into a through hole 36A in the rod end 36 and into the top end 53B of the second lever 53.

As shown in FIGS. 3 and 4, the test apparatus 10 includes a clutch mechanism 60 serving as a power transmitting part for establishing or undoing the coupling between the first levers 51 and 52 and the second lever 53. The clutch mechanism 60 includes a pin 61 configured to penetrate through the first levers 51 and 52 and the second lever 53 and an operating lever 62 for operating the pin 61. The pin 61 is a columnar member. The operating lever 62 is a member shaped like a quadrangular prism. The first lever 51 has a through hole 51C formed therein, through which the pin 61 may penetrate. The first lever 52 has a through hole 52C formed therein, through which the pin 61 may penetrate. The second lever 53 has a through hole 53C formed therein, through which the pin 61 may penetrate. The pin 61 corresponds to a pin part. The operating lever 62 corresponds to an operating lever part.

A base end 62A of the operating lever 62 is positioned near a top end 51B of the first lever 51 such that the base end 62A is capable of being rotated by a first rotational shaft 63. In the operating lever 62, a first long hole 62B, through which the first rotational shaft 63 is inserted, is provided near the base end 62A such that the first long hole 62B extends along the extending direction of the operating lever 62. While the pin 61 moves linearly, the operating lever 62 makes rotational movement around the first rotational shaft 63. Thus, the first long hole 62B absorbs the variability in the movement.

A base end 61A of the pin 61 is arranged in the vicinity of the middle of the operating lever 62 in the extending direction of the operating lever 62 such that the base end 61A is capable of being rotated by a second rotational shaft 64. In the operating lever 62, a second long hole 62C, through which the second rotational shaft 64 is inserted, is provided in the vicinity of the middle of the operating lever 62 in the extending direction of the operating lever 62. The second long hole 62C extends in the extending direction of the operating lever 62. While the pin 61 moves linearly, the operating lever 62 makes rotational movement around the first rotational shaft 63. Thus, the second long hole 62C absorbs the variability in the movement.

The operating lever 62 moves the pin 61 between a penetrating position at which the pin 61 penetrates through the first and second levers 51, 52 and 53 and a non-penetrating position at which the pin 61 does not penetrate through the first and second levers 51, 52 and 53. The pin 61 is configured to be inserted into the through hole 51C in the first lever 51, into the through hole 53C in the second lever 53 and into the through hole 52C in the first lever 52.

The following now describes the effects produced by the test apparatus for an actuator having the above-described configurations.

As shown in FIG. 3, as a top end 62D of the operating lever 62 is rotated by a user around the first rotational shaft 63 in a direction toward the first lever 51, the pin 61 is inserted into the through hole 51C in the first lever 51, into the through hole 53C in the second lever 53 and into the through hole 52C in the first lever 52. This causes the pin 61 to couple together the first levers 51 and 52 and the second lever 53. This condition makes it possible to transmit the load produced by the load part 40 to the second lever 53 via the first levers 51 and 52 and the pin 61. When the actuator is activated, the load produced by the load part 40 is transmitted to the actuator via the second lever 53, the idler link 30, the coupling lever 27, the coupling shaft 26, the passive lever 25, the coupling link 24, and the driving part 22. The pin 61 is immobilized by frictional force but, after inserted, may be mechanically retained so that the first rotational shaft 63 does not rotate. The operating lever 62 is preferably locked in an unmovable manner while the force is transmitted and not transmitted. For example, a male screw is provided in the first rotational shaft 63 and immobilized by a nut. In this way, the operating lever 62 can be locked. In a similar manner, a male screw may be also provided in the second rotational shaft 64 and immobilized by a nut.

Figure 6:
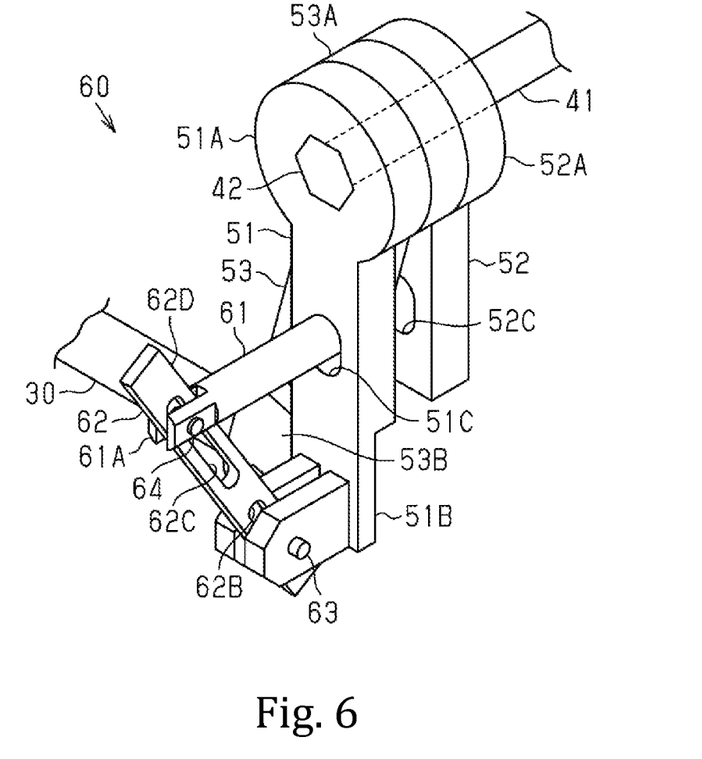
FIG. 6 is a perspective view showing the power transmitting part of the actuator test apparatus in a decoupled state.

As shown in FIG. 6, when the top end 62D of the operating lever 62 is rotated around the first rotational shaft 63 in a direction away from the first lever 51, the pin 61 is pulled out of the first and second levers 51, 52 and 53. This undoes the coupling between the first levers 51 and 52 and the second lever 53. Here, the coupling between the first levers 51 and 52 and the second lever 53 can be undone unless the pin 61 penetrates through the through hole 53C in the second lever 53. Under such a condition, when the actuator is driven, only the second lever 53 can move in such a direction that the idler link 30 moves toward the attaching device 20.

Advantageous effects of the embodiment will be now described.

(1) The clutch mechanism 60 establishes or undoes the coupling between the first levers 51 and 52, which swing in connection with the load part 40, and the second lever 53, which is connected to the idler link 30 to which the output is transmitted from the actuator. This means that it is easy to switch whether to establish or undo the coupling with the load part 40.

(2) It can be easily done to pull the pin 61 out of the first levers 51 and 52 and the second lever 53 and to insert the pin 61 into the first levers 51 and 52 and the second lever 53 by rotating the operating lever 62, which is configured to swing with respect to the first levers 51 and 52.

(3) Since the second lever 53 is sandwiched between the first lever 51 and the first lever 52, in other words, is not supported on only one side, the pin 61 is equally loaded.

(4) Since the base end 62A of the operating lever 62 is arranged on the lower side with respect to the middle of the operating lever 62 at which the pin 61 is provided, the operating lever 62 can be easily operated.

(5) Since the second lever 53 holds the idler link 30 on both sides, in other words, not only on one side, the coupling between the second lever 53 and the idler link 30 is equally loaded.

Other Embodiments

The foregoing embodiment can be modified as described below. The above embodiment and the following modifications can be implemented in combination to the extent where they are technically consistent to each other.

Figure 7:
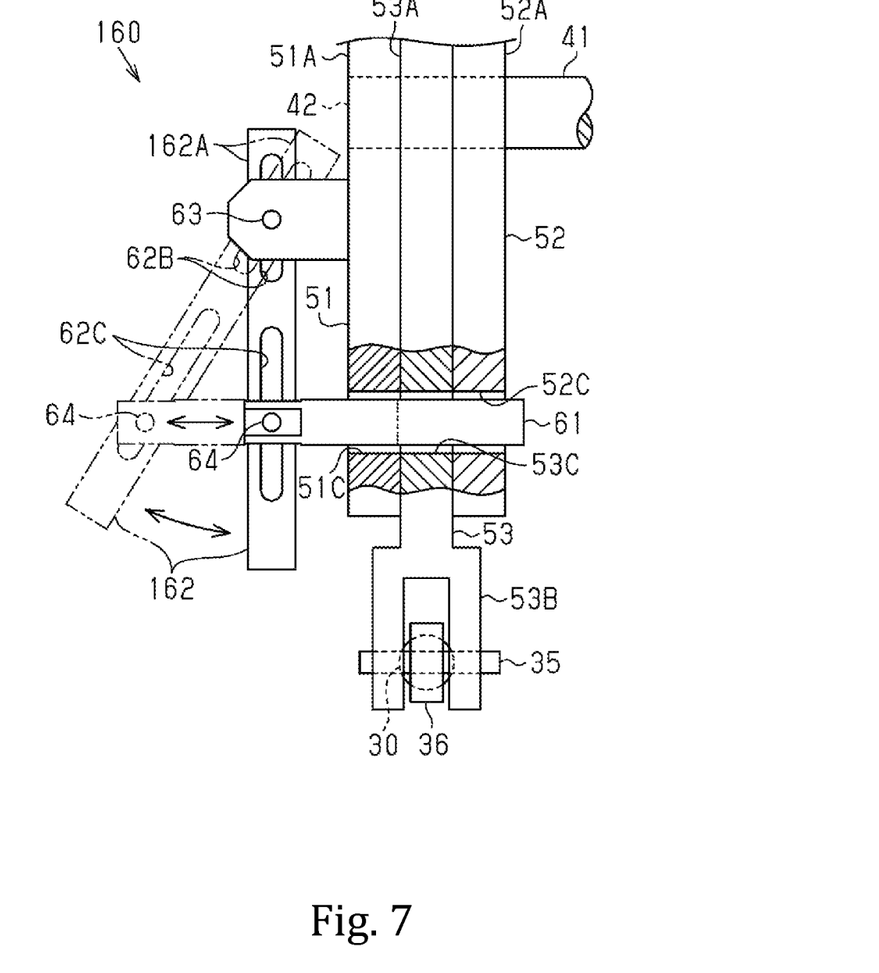
FIG. 7 is a side view showing a modification example of the power transmitting part of the actuator test apparatus

In the above-described embodiment, the base end 62A of the operating lever 62, which is provided on the first lever 51, is positioned on the lower side with respect to the middle of the operating lever 62, at which the pin 61 is coupled. However, one of the ends of the operating lever, which is provided on the first lever, may be alternatively positioned on the upper side with respect to the position at which the pin is coupled to the operating lever. For example, as shown in FIG. 7, a base end 162A of an operating lever 162 is arranged near the base end 51A of the first lever 51 in a clutch mechanism 160. The base end 162A of the operating lever 162 is positioned on the upper side with respect to the middle of the operating lever 162, at which the pin 61 is coupled.

In the above-described embodiment, the top end 53B of the second lever 53 is coupled to the rod end 36 such that the base end 31 (the rod end 36) of the idler link 30 is sandwiched in the top end 53B. However, the base end of the idler link 30 may be alternatively coupled to the second lever 53 such that the top end of the second lever 53 is sandwiched in the base end of the idler link 30.

In the above-described embodiment, the first levers 51 and 52, which are immobilized onto the load shaft 41, sandwich the second lever 53, which is coupled to the idler link 30. However, two second levers, which are coupled to the idler link 30, may alternatively sandwich one first lever, which is immobilized onto the load shaft 41.

In the above-described embodiment, the cross-sectional shape of the pin 61 may not be limited to circular, but may be a different shape such as an ellipsoid, a polygon, or a star.

In the above-described embodiment, the outer diameter of the pin 61 may decrease from the base end 61A toward the top end. This configuration makes it easy to insert the pin 61 into the first levers 51 and 52 and the second lever 53. Additionally, the pin 61 can be prevented from shaking.

In the above-described embodiment, as for the through hole 51C in the first lever 51, the through hole 53C in the second lever 53 and the through hole 52C in the first lever 52, their inner diameter may increase in size as the distance between them and the operating lever 62 decreases.

In the above-described embodiment, the first long hole 62B and the second long hole 62C are provided in the operating lever 62. However, only one of the first and second long holes 62B and 62C may be alternatively provided in the operating lever 62.

In the above-described embodiment, the clutch mechanism 60 includes the pin 61 and the operating lever 62. However, the power transmitting mechanism may alternatively include only a pin. In this case, the first lever, which is immobilized onto the load shaft 41, is coupled to the second lever, which is coupled to the idler link 30, by the user inserting the pin into the first and second levers, and the coupling between the first and second levers may be undone by the user pulling out the pin.

In the above-described embodiment, the clutch mechanism 60 includes the pin 61 and the operating lever 62.

However, the power transmitting mechanism may alternatively include only a screw. In this case, the first lever, which is immobilized onto the load shaft 41, is coupled to the second lever, which is coupled to the idler link 30, by the user inserting the screw into the first and second levers, and the coupling between the first and second levers may be undone by the user pulling out the screw.

In the above-described embodiment, the pin 61 is inserted from the front side into the through hole 51C in the first lever 51, into the through hole 53C in the second lever 53 and into the through hole 52C in the first lever 52. However, the coupling between the first levers 51 and 52 and the second lever 53 may be established and undone from the lateral side.

Figure 8:
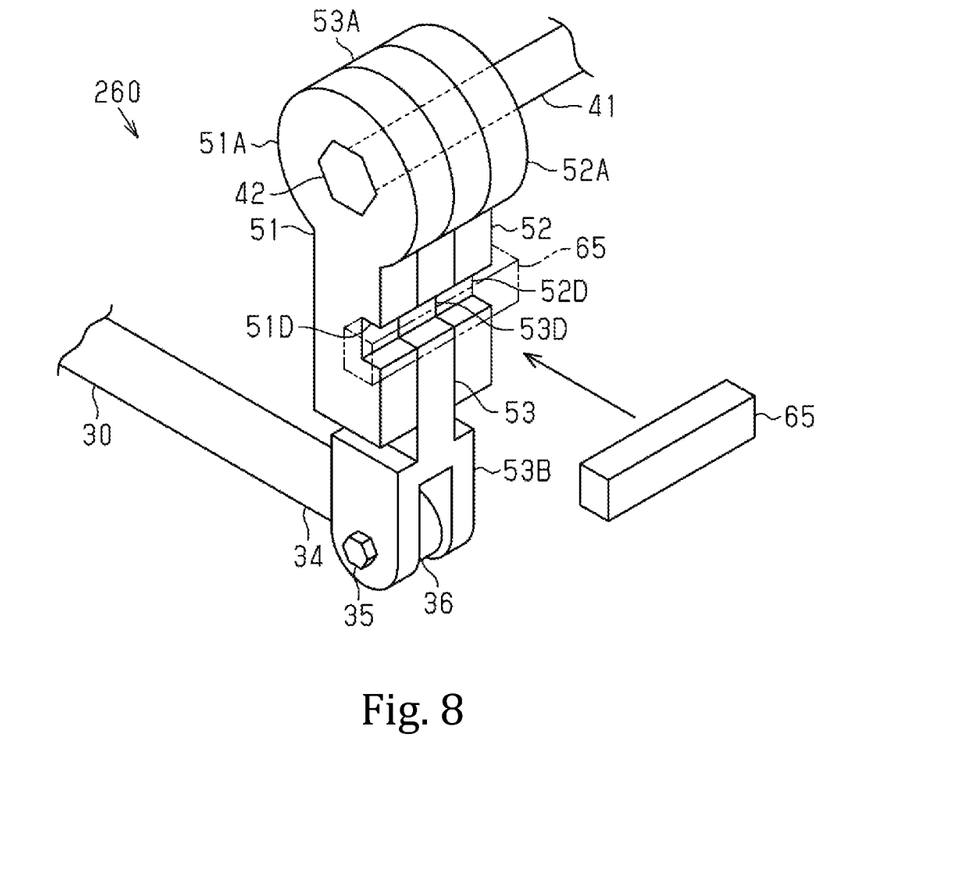
FIG. 8 is a perspective view showing a modification example of the power transmitting part of the actuator test apparatus.

For example, as shown in FIG. 8, a power transmitting mechanism 260, which serves as a power transmitting part, couples the first levers 51 and 52 and the second lever 53 by fitting a coupling rod 65 into fitting grooves 51D and 52D on the side surface of the first levers 51 and 52 and a fitting groove 53D on the side surface of the second lever 53.

Figure 9:
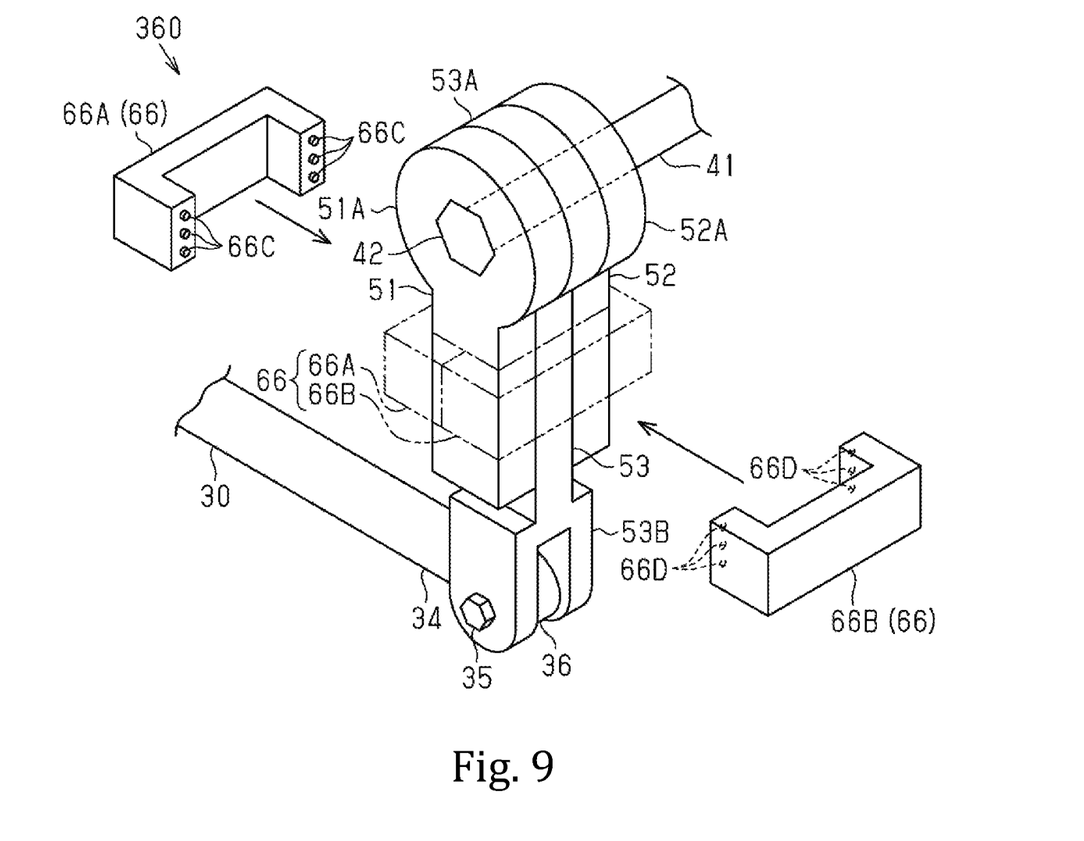
FIG. 9 is a perspective view showing a modification example of the power transmitting part of the actuator test apparatus.

As another example, as shown in FIG. 9, a power transmitting mechanism 360, which serves as a power transmitting part, couples the first levers 51 and 52 and the second lever 53 by attaching an annular member 66 to externally surround the first levers 51 and 52 and the second lever 53. The annular member 66 is made up by two separate members, namely, a first member 66A and a second member 66B. The first member 66A has a plurality of protrusions 66C formed therein and the second member 66B has a plurality of depressions 66D formed therein, to which the protrusions 66C are fitted. The first member 66A is coupled to the second member 66B via the protrusions 66C and the depressions 66D.

In the above-described embodiment, the operating lever 62 of the clutch mechanism 60 is operated by a user. However, the power transmitting part may alternatively include a coupling member such as a pin and an electric motor or solenoid for moving the power transmitting part. In this case, the first lever, which is immobilized onto the load shaft 41, is coupled to the second lever, which is coupled to the idler link 30, by the electric motor or solenoid, and the coupling between the first and second levers may be undone by the electric motor or solenoid.

In the above-described embodiment, the operating lever 62 of the clutch mechanism 60 is operated by a user. However, the power transmitting part may be alternatively configured as an electric hydraulic clutch. In this case, the output from the load shaft 41 may be coupled to the output from the idler link 30 using the electric hydraulic clutch, and the coupling may be undone by the electric hydraulic clutch.

In the above-described embodiment, the attaching device 20 is not limited to having the above-described configurations as long as the attaching device 20 allows an actuator, which is to be subjected to a load test, to be attached thereto and the load part may apply load onto the actuator via the power transmitting part.

In the above-described embodiment, a turnbuckle or the like may be provided on the idler link 30 so that the length can be adjusted. In this way, zero-load position may be adjusted.

In the above-described embodiment, the load part 40 may be configured to output load to be applied to the actuator to be tested. However, the load part may be alternatively configured to output load to be applied to the actuator to be tested, in the form of rotational force.

In the above-described embodiment, the load part 40 may be configured to mechanically apply load using a torsion spring. However, the load part may be alternatively configured to mechanically apply load using a fluid damper such as a hydraulic damper.

What is claimed is:

1. A test apparatus for testing an actuator, the test apparatus comprising:
a load part configured to output load to be applied to the actuator to be tested;
a first lever part configured to swing around a rotational shaft in connection with an output from the load part;
a link part configured to be coupled to the output from the actuator to be tested;
a second lever part configured to be coupled to the link part in a swingable manner, the second lever part configured to swing around a rotational shaft that is coaxially arranged with the rotational shaft of the first lever part; and
a power transmitting part configured to establish and undo coupling between the first lever part and the second lever part,
wherein the power transmitting part includes:
a pin part for penetrating through the first lever part and the second lever part; and
an operating lever part provided on the first lever part in a swingable manner, the operating lever part configured to move the pin part between a penetrating position at which the pin part penetrates through the first and second lever parts and a non-penetrating position at which the pin part does not penetrate through the first and second lever parts.

2. The test apparatus for an actuator according to claim 1, wherein one of the first and second lever parts is held by the other on both sides thereof.

3. The test apparatus for an actuator according to claim 1, wherein one end of the operating lever part provided on the first lever part is positioned lower than a position in the operating lever part at which the pin part is provided on the operating lever part.

4. The test apparatus for an actuator according to claim 1, wherein one of the second lever part and the link part is coupled to the other on both sides thereof.

* * * * *